United States Patent [19]

Nelsen

[11] 4,139,090

[45] Feb. 13, 1979

[54] ARTICLE TRANSFER MECHANISM

[75] Inventor: Roger J. Nelsen, Hastings, Mich.

[73] Assignee: Gulf & Western Manufacturing Company, Southfield, Mich.

[21] Appl. No.: 754,083

[22] Filed: Dec. 23, 1976

[51] Int. Cl.$^2$ .............................................. B65G 25/02
[52] U.S. Cl. ..................................... 198/740; 198/487; 198/745
[58] Field of Search ............... 198/430, 487, 718, 719, 198/740, 741, 745, 621, 695, 696

[56] References Cited

U.S. PATENT DOCUMENTS

| | | | |
|---|---|---|---|
| 2,934,194 | 4/1960 | Adams | 198/621 |
| 3,011,464 | 12/1961 | Danly et al. | 198/621 |
| 3,061,078 | 10/1962 | Davies | 198/621 |
| 3,229,801 | 1/1966 | Gartner | 198/695 |
| 3,262,541 | 7/1966 | De Gain | 198/621 |
| 3,381,793 | 5/1968 | Booth | 198/740 |
| 3,590,986 | 7/1971 | Andrews et al. | 198/696 |

*Primary Examiner*—Robert B. Reeves
*Assistant Examiner*—Richard K. Thomson
*Attorney, Agent, or Firm*—Meyer, Tilberry & Body

[57] ABSTRACT

An article transfer mechanism is disclosed comprising a pair of longitudinally and laterally reciprocable feed bars having opposed cooperable article engaging feed fingers therebetween. The feed bars are supported at opposite ends for longitudinal sliding movement relative to feed bar support members which in turn are supported for linear lateral movement toward and away from one another. An oscillatory drive arrangement is provided at one end of the feed bars for reciprocating the bars longitudinally, and rotatable drum-type cam drive units are provided at each end of the feed bars for reciprocating the support members and thus the feed bars laterally toward and away from one another.

9 Claims, 7 Drawing Figures

ARTICLE TRANSFER MECHANISM

This invention relates to the art of material handling and, more particularly, to a reciprocating article transfer mechanism for advancing articles step by step along a linear feed path.

The present invention finds particular utility in connection with the step by step advancement of a workpiece relative to a plurality of work stations in a metalworking press. Accordingly, the invention will be described with regard to such use; however, it will be appreciated that the invention has utility in connection with transferring articles other than press workpieces and in conjunction with apparatus other than presses.

Transfer feed mechanisms have been provided heretofore for advancing workpieces step by step through a metalworking press such that a workpiece is picked up at one station, advanced to the next station and then released for the performance of work thereon by the press. Among such transfer mechanisms are those including a pair of longitudinally and laterally reciprocable feed bars having opposed pairs of cooperable feed fingers therebetween. The feed bars are adapted to be displaced laterally away from one another to release the fingers from engagement with an article, displaced longitudinally in one direction to position another set of fingers in alignment with the article, displaced laterally toward one another for the article to be received between the new pair of fingers, and then advanced longitudinally in the opposite direction to move the article to the next work station. Such movement is of course coordinated with the stroke of the press slide such that the engagement, transfer and release functions of the feed mechanism take place during the non-working portion of the total stroke of the press.

A variety of arrangements have been provided heretofore for imparting the longitudinal and lateral reciprocating motions to the feed bars and thus the feed fingers associated therewith. Such previous efforts have included cam and linkage assemblies including rotating cams and long linkage trains involving a number of pivotally interrelated component parts. Other arrangements have included oscillating levers and linkage trains, again involving a considerable number of pivotally interconnected component parts. In view of the longitudinal and lateral reciprocating motions imparted to the feed bars it is necessary to have separate drive mechanisms therefore which generally are driven from a common drive source such as the crankshaft of the press so as to coordinate the operation of the transfer feed mechanism with press operation. Even though the mechanisms are driven by the press, a principal disadvantage of the mechanisms heretofore provided has been the inability to time the separate longitudinal and lateral displacements with sufficient precision for high speed press operation. In this respect, links, levers, bell cranks and the like, introduce errors through long chains of action which effect the ability to achieve and maintain desired timing relationships between the longitudinal and lateral displacements. Further, operation of a feed transfer mechanism is continuous and accordingly requires a continuous and repeated change of direction with respect to the feed bars. In connection with this requirement, the drive arrangements heretofore provided consume a considerable amount of energy as a result of heavy links, levers, bell cranks and the like, whereby high frictional losses are encountered which hinder high speed operation. Thus, the inability to obtain close coordinated action of the longitudinal and lateral drives for the feed bars heretofore has impeded the use of such feed mechanisms in high speed presses.

The foregoing and other difficulties and disadvantages encountered in connection with previous transfer feed mechanisms are overcome or minimized in accordance with the present invention by an improved arrangement for achieving lateral displacement of the feed bars which minimizes energy loss and enables improved timing capabilities and thus higher speed press operation than heretofore possible. More particularly in accordance with the present invention, continuously rotating cams directly drive the feed bars in a manner to achieve relative lateral displacement therebetween. This continuous rotating and positive drive arrangement enables optimizing timing of such lateral reciprocation and thus coordination thereof with longitudinal reciprocation of the feed bars. By maximizing the use of rotary motion to achieve lateral displacement of the feed bars, energy losses heretofore encountered through long linkage trains is minimized. Still further, reciprocating movement of the feed bars is preferably achieved through use of a rotary-to-oscillatory drive mechanism, whereby the input to the separate drive mechanisms for achieving lateral and longitudinal reciprocation are both rotary. This enables optimizing the timing between the lateral and longitudinal reciprocating movement of the feed bars.

It is accordingly an outstanding object of the present invention to provide an improved drive arrangement for a transfer feed mechanism involving longitudinal and lateral reciprocating movements of feed bars.

Another object is the provision of an improved drive arrangement of the foregoing character in which the use of rotary motion is optimized to achieve longitudinal and lateral reciprocation of the feed bars.

Yet another object is the provision of a drive arrangement of the foregoing character which minimizes energy losses and inertia on the component parts, thus to enable higher speed operation of the transfer feed mechanism than heretofore possible.

Still another object is the provision of a drive arrangement of the foregoing character which enables accurate timing and close coordination with respect to the longitudinal and lateral reciprocating movements imparted to the feed bars.

Still another object is the provision of a drive arrangement of the foregoing character in which lateral reciprocation of the feed bars is achieved by a positive direct drive from rotatable cams.

The foregoing objects, and others, will in part be obvious and in part pointed out more fully hereinafter in conjunction with the written description of a preferred embodiment of the invention illustrated in the accompanying drawings in which.

Figure 1:
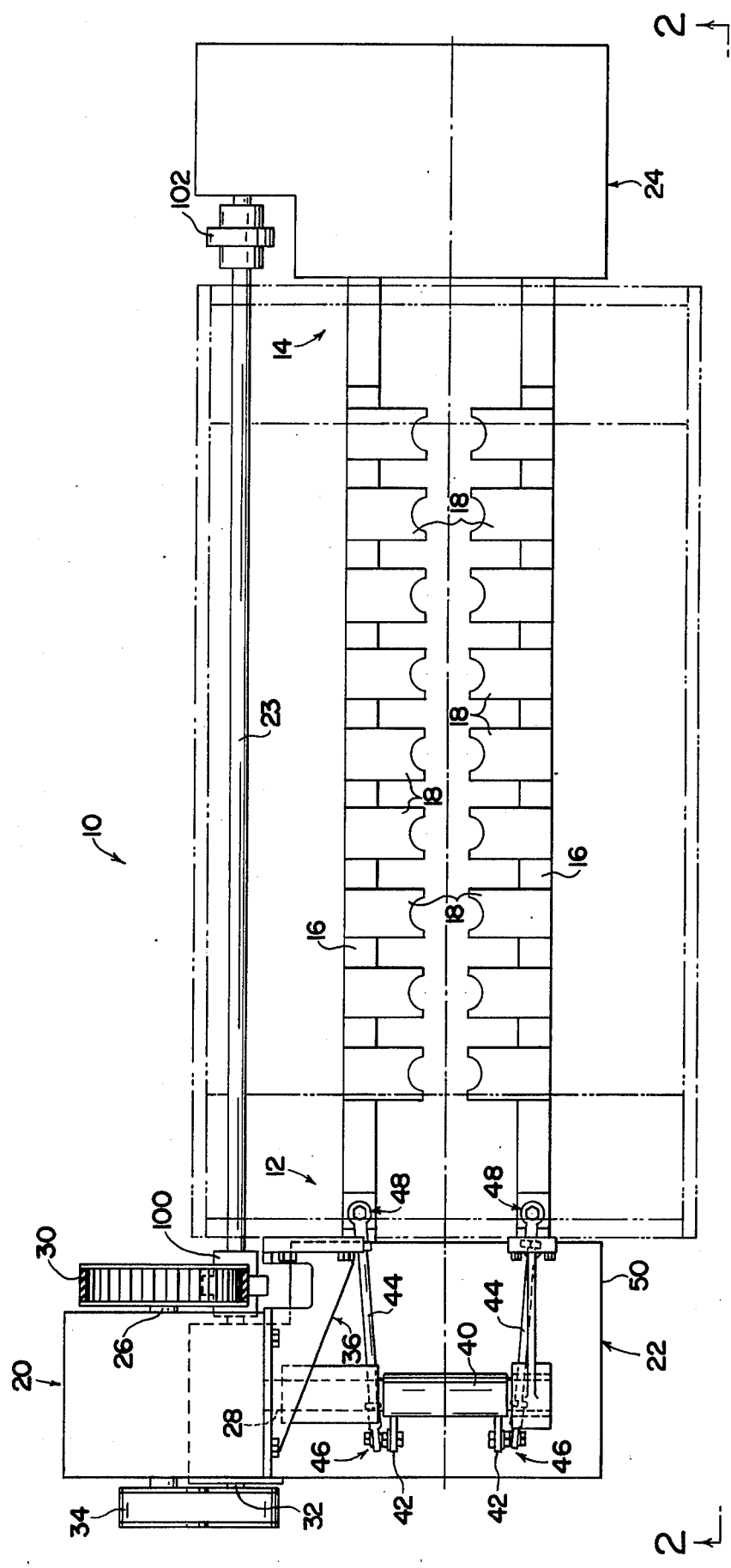
FIG. 1 is a plan view of a transfer feed mechanism in accordance with the present invention.
Figure 2:
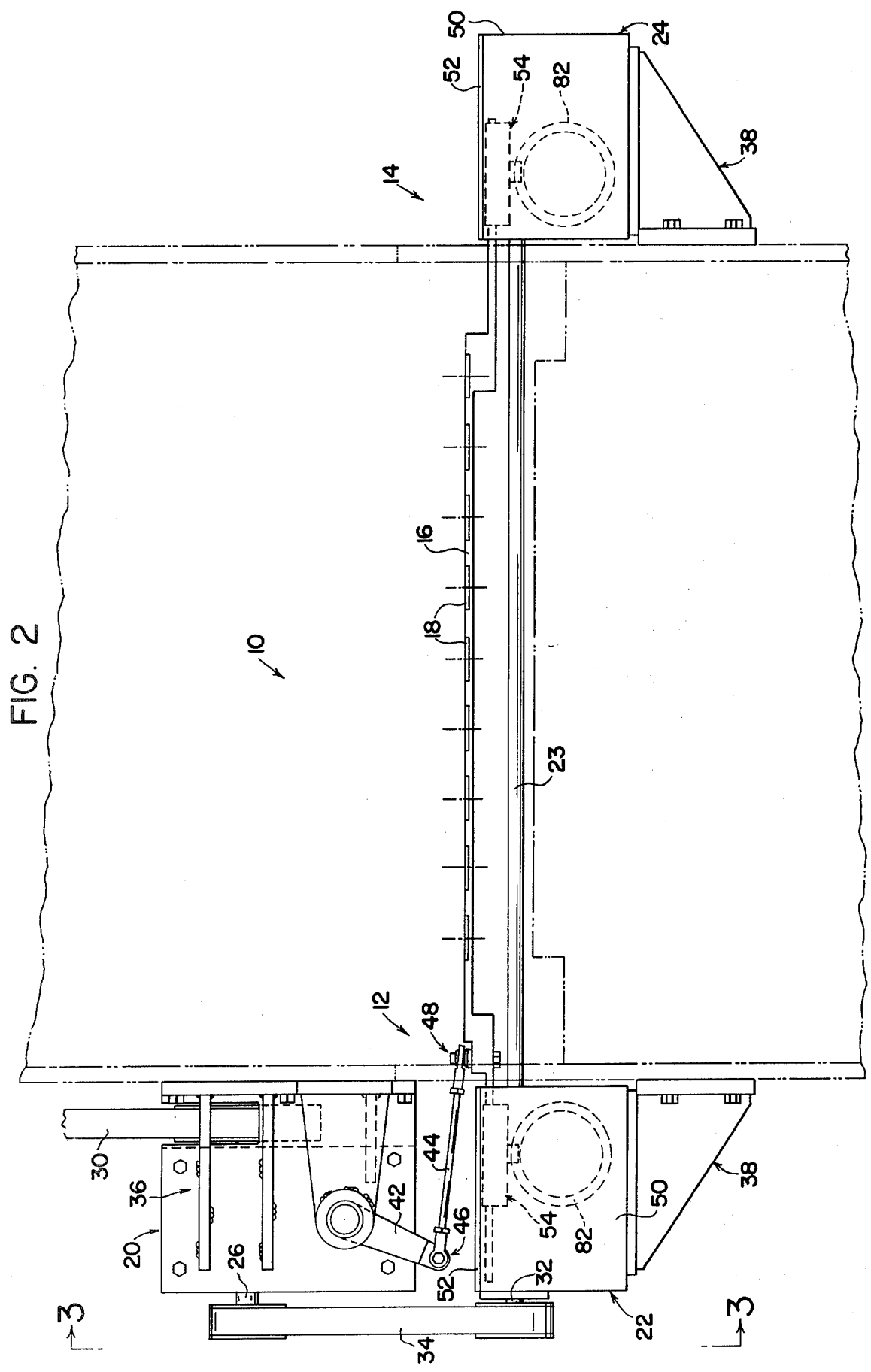
FIG. 2 is a side elevation view of the mechanism taken along line 2—2 in FIG. 1.
Figure 3:
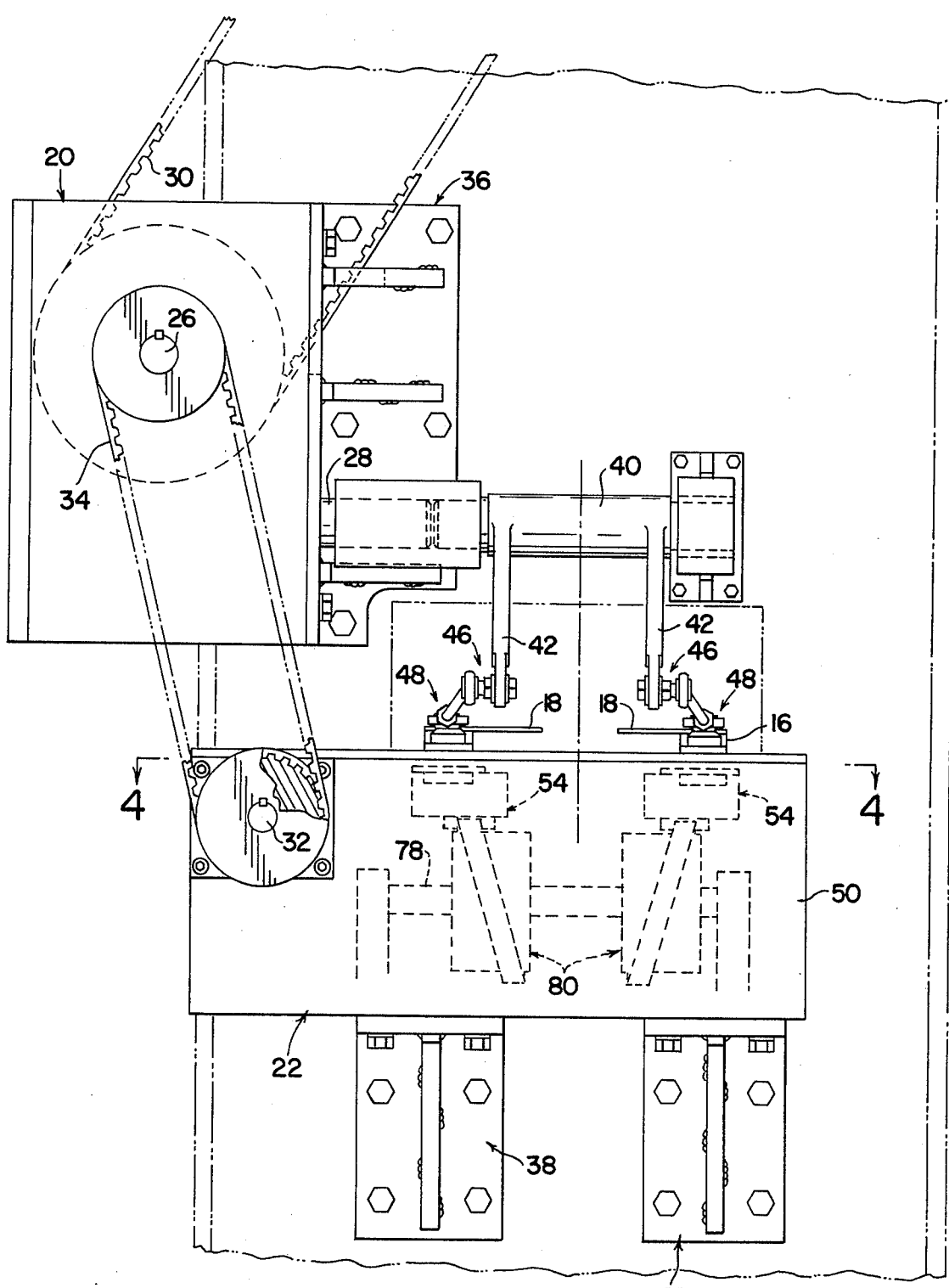
FIG. 3 is an end elevation view of the mechanism taken along line 3—3 in FIG. 2.

Referring now in greater detail to the drawings wherein the showings are for the purpose of illustrating a preferred embodiment of the invention only and not for the purpose of limiting the same, FIGS. 1–3 illustrate a transfer feed mechanism for use with a press in which a workpiece is to be transferred step by step to a plurality of successive work stations between opposite sides of the press. As is well known in the art, workpieces are conveyed to the input end of the transfer mechanism and are moved step by step across the press bed or a bolster plate thereon to the exit end of the transfer mechanism at which point the workpieces are picked up by a suitable discharge conveying mechanism. Accordingly, it will be appreciated with regard to FIGS. 1–3 that the transfer feed mechanism designated generally by the numeral 10 is mounted on the press frame to span the press bed such that workpieces are transferred across the press bed from input end 12 to discharge end 14 of the transfer mechanism. Basically, the transfer feed mechanism includes a pair of parallel feed bars 16 carrying a plurality of opposed pairs of feed fingers 18 along the lengths thereof. Typically, bars 16 are reciprocated longitudinally and laterally in a pattern which provides for fingers 18 to move laterally apart to release a workpiece therebetween, to move longitudinally in the direction of input end 12 of the mechanism, to move laterally inwardly to grip a new workpiece therebetween, and then to move longitudinally in the direction of output end 14 of the mechanism to transfer the workpiece to the next work station.

In the embodiment illustrated, feed bars 16 are longitudinally reciprocated by means of a drive unit 20 at the input end of the feed mechanism and are laterally reciprocated by means of a drive unit 22 at the input end of the mechanism and a similar drive unit 24 at the discharge end of the drive unit and which is driven in synchronism with drive unit 22 through a cross shaft 23 therebetween. As will be described in greater detail hereinafter, the opposite ends of feed bars 16 are supported for longitudinal and lateral reciprocation relative to the press bed by components of drive units 22 and 24.

Drive unit 20 is a mechanism adapted to translate rotary motion into oscillating motion and, in the preferred embodiment, is a well known and commercially available Ferguson Cam Box. As is well known in the art, such a unit has a rotatable input shaft 26 and an output shaft 28 which oscillates in response to rotation of shaft 26. In connection with the transfer feed mechanism of the present invention, one end of input shaft 26 is connected to the press crank shaft, not shown, through a timing belt 30 so that oscillation of output shaft 28 is timed with respect to the press drive. Input shaft 26 extends through the cam box and the other end of the shaft is connected with an input shaft 32 of drive unit 22 through a timing belt 34. The timing belt provides for the operation of drive units 22 and 24 to be synchronized with the oscillating movements of output shaft 28 of drive unit 20. It will be appreciated of course that drive unit 20 is suitably mounted on the press frame such as by a bracket assembly 36 and that drive units 22 and 24 are likewise suitably mounted on the press frame such as by corresponding bracket assemblies 38. Output shaft 28 of drive unit 20 is coupled to a member 40 provided with a pair of laterally spaced apart arms 42, and feed bars 16 are reciprocated together longitudinally by means of corresponding wobble links 44 coupled to arms 42 by universal couplings 46 and to feed bars 16 by universal couplings 48.

In accordance with the present invention, feed bars 16 are laterally reciprocated relative to one another and to the press bed by means of drive units 22 and 24. The latter drive units are substantially identical in structure and operation and the differences therebetween will be apparent and will be pointed out hereinafter in conjunction with the description of drive unit 22 illustrated in FIGS. 4–7 of the drawing. With regard to the latter Figures, drive unit 22 includes a housing 50 provided with a cover 52. The end of housing 50 facing the press has openings 53 which receive the corresponding ends of feed bars 16, and the latter ends of the feed bars are longitudinally slidably received in corresponding feed bar support members 54. More particularly, each member 54 is provided with a recess 55 slidably receiving the corresponding feed bar and which recess is covered by a plate 56 to retain the feed bar against upward displacement relative to the support members. Each support member 54 is provided with a pair of parallel laterally extending openings 58 receiving corresponding laterally extending guide rods 60 having opposite ends fastened in place with respect to housing 50 such as by corresponding brackets 62. Preferably, ball bushings 64 are interposed between openings 58 and rods 60 to enhance lateral sliding of support members 54 along the guide rods.

Housing 50 is provided adjacent its laterally opposite sides with support bracket assemblies 66 and 68. Bracket assembly 66 includes an upright bracket arm 70, and bracket assembly 68 includes a T-shaped bracket arm including an upright arm portion 72 and a longitudinally extending arm portion 74. Additionally, bracket assembly 68 includes an upright arm 76 parallel to upright arm 72 and spaced laterally inwardly therefrom within the housing. Bracket arm 70 and bracket arm portion 74 rotatably support the opposite ends of a laterally extending cam shaft 78.

A pair of drum-type cam members 80 are mounted on shaft 78 in underlying relationship with respect to a corresponding one of the feed bar support members 54, and each cam member 80 is provided with a raised peripheral cam track 82. Each of the feed bar support members 54 is provided with a pair of depending roller-type followers 84 engaging laterally opposite sides of the corresponding track 82. The contours of cam tracks 82 provide the desired lateral reciprocation of support members 54, and thus feed bars 16, inwardly and outwardly relative to one another in response to rotation of cam shaft 78. In the embodiment shown, cam shaft 78 is adapted to be rotated through a gear train which includes a miter gear 86 on input shaft 32 of the drive unit, a miter gear 88 mounted on one end of a shaft 90 supported by bracket arm portions 72 and 76 of bracket assembly 68, a spur gear 92 mounted on shaft 90 for rotation therewith, a spur gear 94 mounted at the juncture of arm portions 72 and 74 of bracket assembly 68, and a spur gear 96 mounted on cam shaft 78. Cams 80 are mounted on shaft 78 through wedge-type bushing sleeves 98 which are keyed or otherwise interengaged with the shaft for rotation therewith, and spur gear 96 is keyed or otherwise engaged with shaft 78. Accordingly, it will be appreciated that rotation of input shaft 32 imparts continuous rotation to cam shaft 78 and thus cams 80.

It will be appreciated from the description thus far of drive unit 22 that rotation of cams 80 about the axis of shaft 78 imparts reciprocating movement to feed bar support members 54 laterally toward and away from one another. It will be appreciated too that when the cam components are in the positions illustrated in FIG. 5 support members 54 are in the positions of maximum lateral spacing therebetween, as indicated by the solid line positions thereof in FIG. 5. When the cams are rotated 180° from the positions illustrated in FIG. 5, support members 54 are in the positions of minimum lateral spacing therebetween, as indicated by the broken line positions thereof in FIG. 5. It will be further appreciated that cams 80 provide for lateral outward and inward movement of members 54 once for each revolution of the cams.

Figure 4:
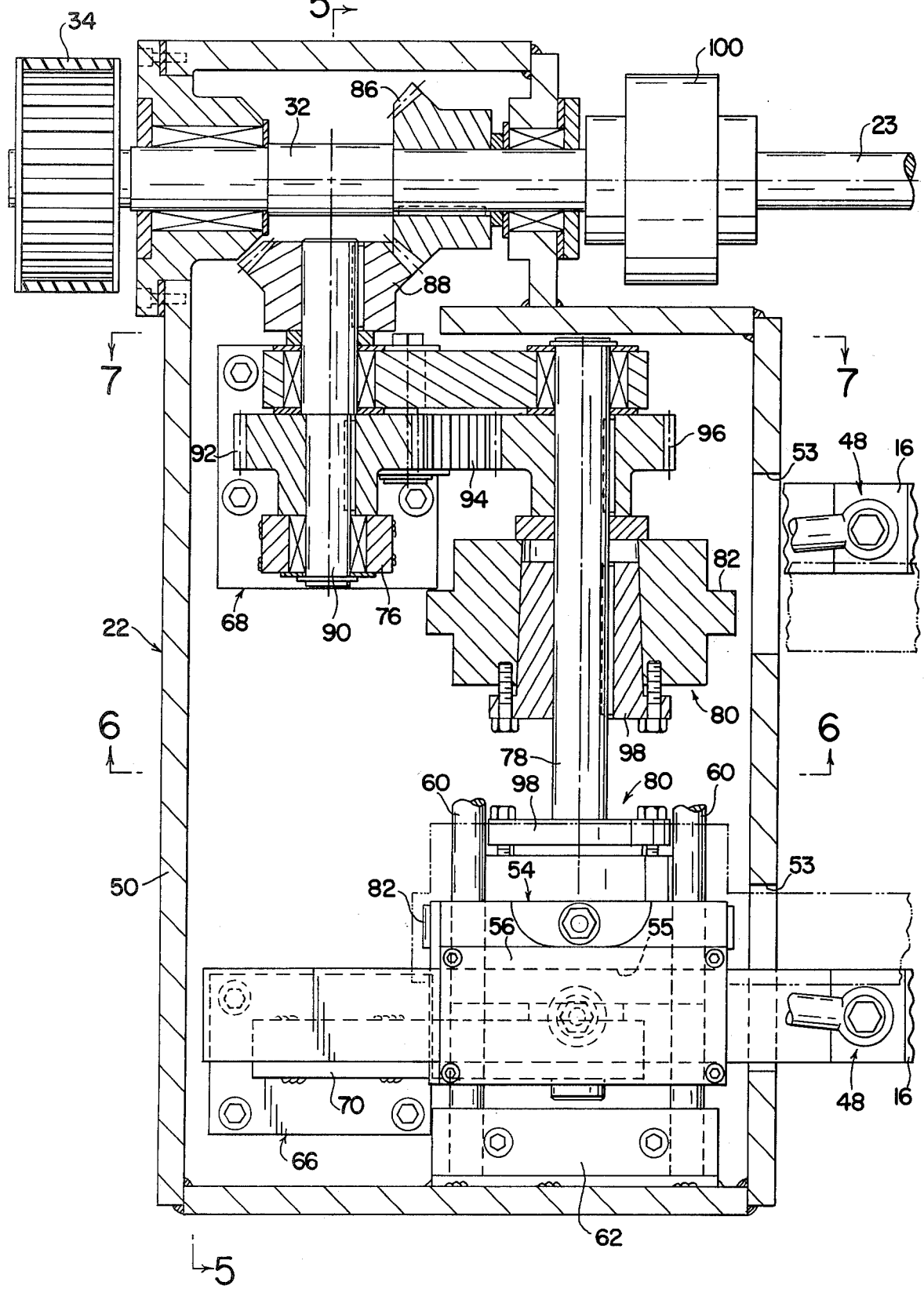
FIG. 4 is a plan view, partially in section, of the drive arrangement by which the feed bars are laterally reciprocated as seen along line 4—4 in FIG. 3.
Figure 5:
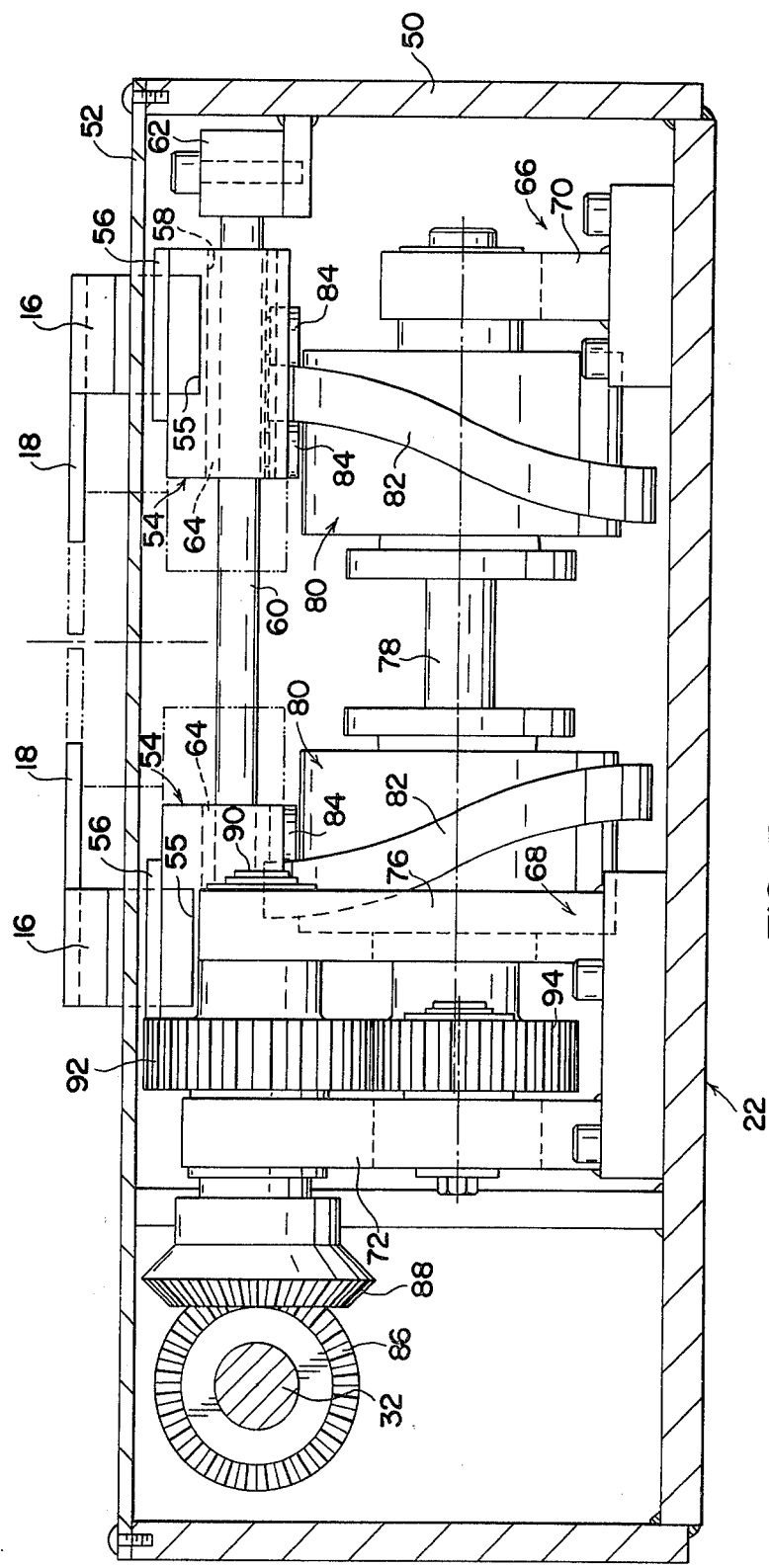
FIG. 5 is a sectional elevation view taken along line 5—5 in FIG. 4.
Figure 6:
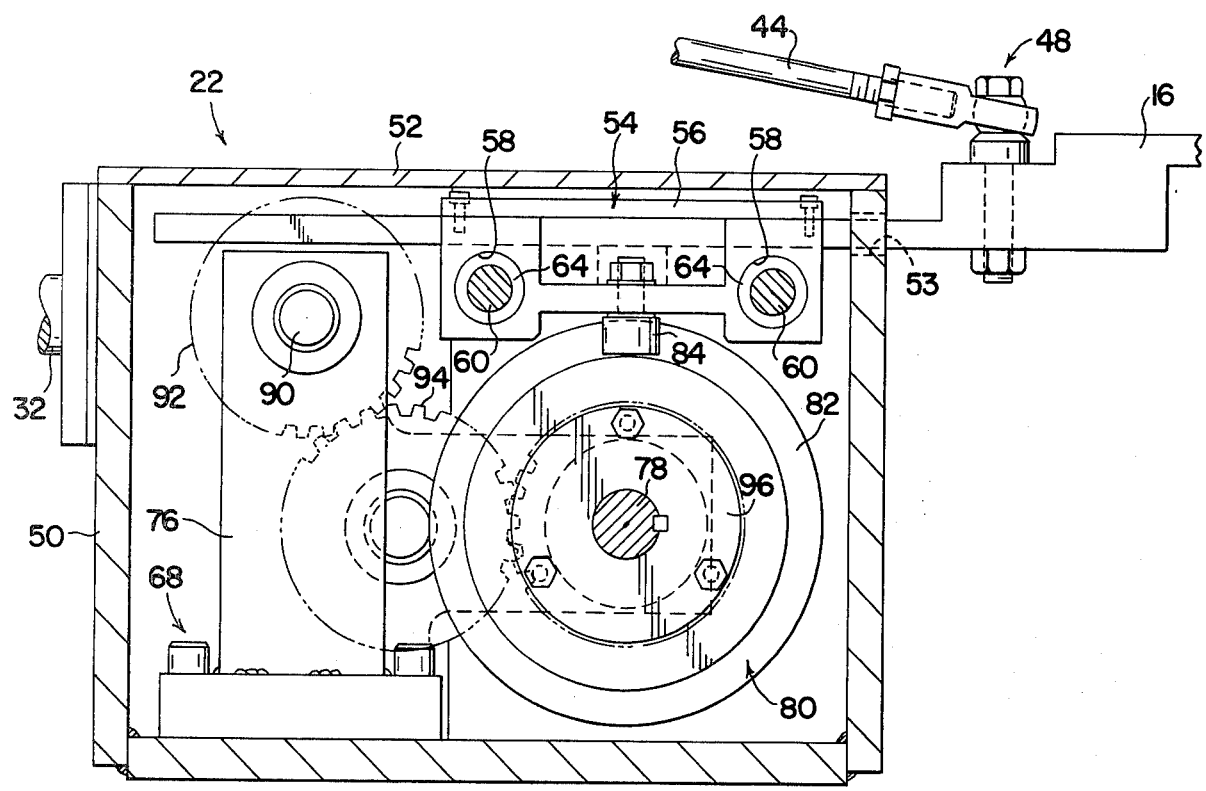
FIG. 6 is a sectional elevation view taken along line 6—6 in FIG. 4.
Figure 7:
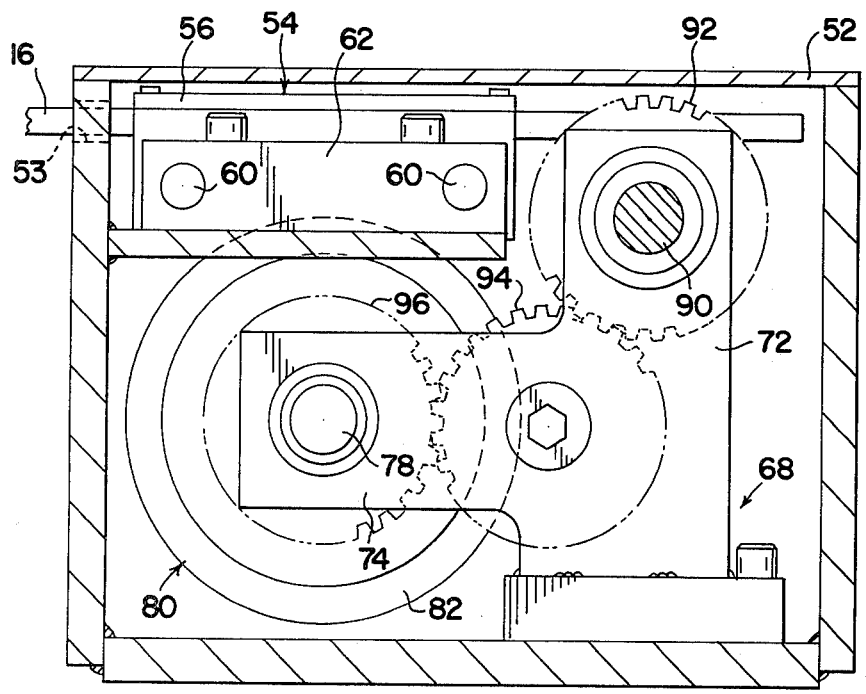
FIG. 7 is a sectional elevation view taken along line 7—7 in FIG. 4.

As mentioned hereinabove, drive units 22 and 24 are adapted to be driven in synchronism through cross shaft 23, and it will be seen from FIG. 4 that input shaft 32 of drive unit 22 is coupled with cross shaft 23 by means of a suitable coupling 100. Further, as mentioned hereinabove, drive units 22 and 24 are substantially identical in structure. In fact, the only difference is a reversal of the positions of the component parts to provide for unit 24 to be driven from the same side as the input to unit 22. It will be appreciated that cross shaft 23 is connected through a coupling 102 with an input shaft of drive unit 24 equivalent to input shaft 32 of unit 22. Accordingly, rotation of input shaft 32 of unit 22 imparts identical rotation to the input shaft of unit 24, whereby the two units are driven in synchronism to achieve simultaneous lateral reciprocation of feed bars 16 outwardly and inwardly relative to one another.

It will be appreciated from the foregoing description that the transfer feed mechanism is operated through the press and in timed coordination therewith through timing belt 30. Further, it will be appreciated that the operation of drive unit 20 is coordinated with the operation of drive units 22 and 24 through timing belt 24 between units 20 and 22. Thus, rotation of timing belt 30 through operation of the press imparts oscillating movement to output shaft 28 to reciprocate feed bars 16 longitudinally relative to the press and rotation of input shaft 32 of drive unit 22 through timing belt 34 causes reciprocation of the feed bars laterally relative to one another in timed coordination with such longitudinal reciprocation. Therefore, during a cycle of operation, feed bars 16 are displaced longitudinally in one direction while in their laterally inward positions, are displaced laterally outwardly relative to one another, are displaced longitudinally in the opposite direction, and are displaced laterally inwardly toward one another to complete the cycle. It will be appreciated that the continuous rotational drive for units 22 and 24 and the direct cam drive of the feed bar support members minimizes energy losses and inaccuracies in timing with regard to coordinating movements of the feed bars in the longitudinal and lateral directions.

While considerable emphasis has been placed herein on the specific structure and structural interrelationships between the component parts of drive units 22 and 24, it will be appreciated that many modifications can be made in the structures shown and described without departing from the principles of the present invention. Accordingly, it is to be distinctly understood that the foregoing descriptive matter is to be interpreted merely as illustrative of the present invention and not as a limitation.

What is claimed is:

1. An article transfer mechanism comprising, a pair of feed bars having cooperable feed fingers therebetween, feed bar support members each supporting one of said feed bars for longitudinal reciprocation, means supporting said support members for linear reciprocation laterally toward and away from one another, means to reciprocate said feed bars longitudinally relative to said support members, cam means supported for rotation about an axis extending laterally of said feed bars and parallel to the plane of lateral movement of said feed bars, and follower means on each said support member directly interengaging with said cam means to displace said support members toward and away from one another in response to rotation of said cam means.

2. The transfer mechanism according to claim 1, wherein said feed bars have opposite ends, said support members, cam means and follower means being provided at each of said opposite ends, and means interconnecting said cam means at said opposite ends for synchronous rotation.

3. The transfer mechanism according to claim 1, wherein said cam means includes a cam member for each of said support members, said cam members having identical cam tracks and being mounted on a common shaft for rotation together.

4. The transfer mechanism according to claim 3, wherein said follower means is roller means on said support members engaging the cam track of the corresponding cam member.

5. The transfer mechanism according to claim 4, wherein said cam tracks are raised peripheral tracks on said cam members and said roller means are pairs of rollers engaging the raised track therebetween.

6. The transfer mechanism according to claim 5, wherein said feed bars have opposite ends, said support members, cam means and follower means being provided at each of said opposite ends, and means interconnecting said cam means at said opposite ends for synchronous rotation.

7. An article transfer mechanism comprising a pair of feed bars having opposite ends and opposed pairs of feed fingers between said opposite ends, support means at each of said opposite ends, a pair of feed bar support members supported by each support means for linear reciprocation laterally toward and away from one another, each support member receiving and supporting the corresponding end of one of said feed bars for longitudinal sliding movement relative thereto, means for reciprocating said feed bars longitudinally, a pair of rotatable cams for each pair of support members and supported by the corresponding support means for rotation together about an axis extending laterally of said feed bars, each cam of said pair having a cam track, and follower means on each support member directly engaging the cam track of the corresponding cam for rotation of said cams of each pair to laterally reciprocate said support members toward and away from one another, and means to rotate said pairs of cams.

8. The transfer mechanism according to claim 7, wherein said follower means is roller means on said support members engaging the cam track of the corresponding cam member.

9. The transfer mechanism according to claim 8, wherein said cam tracks are raised peripheral tracks on said cam members and said roller means are pairs of rollers engaging the raised track therebetween.

* * * * *